A. M. LAYCOCK.
ROLLER BEARING.
APPLICATION FILED MAR. 13, 1919.
1,338,939.                                   Patented May 4, 1920.
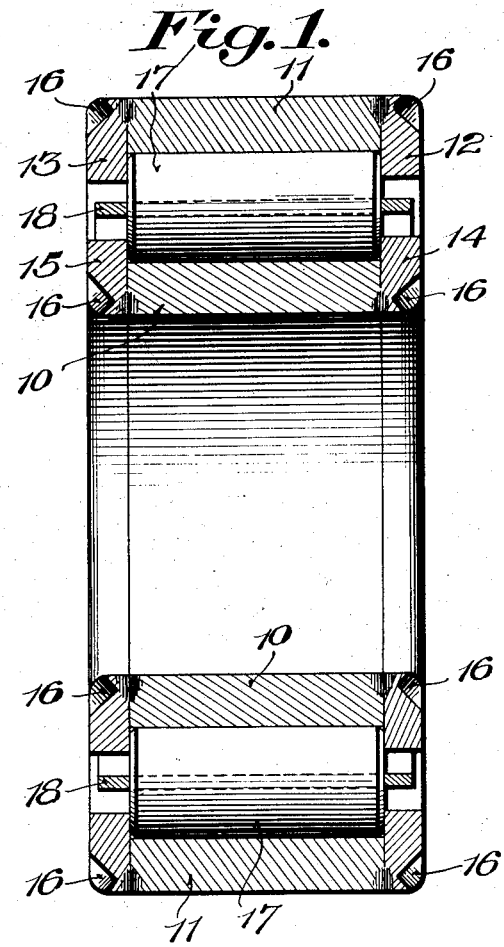
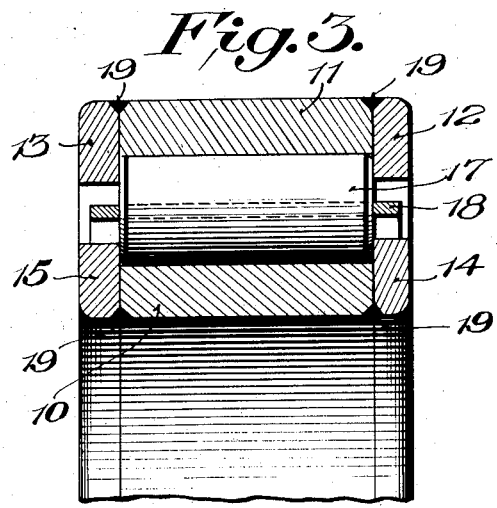
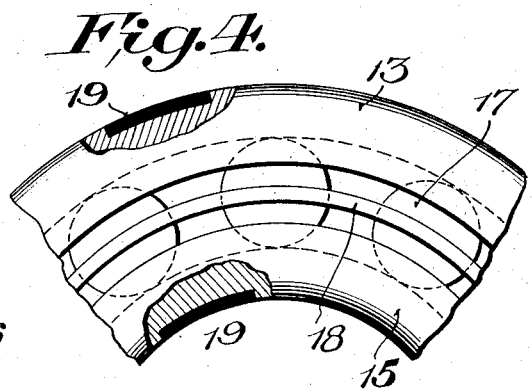
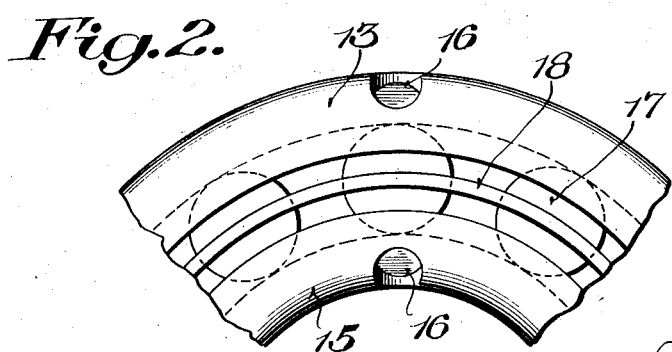
Witness
Chas. L. Griesbauer
Inventor
Arthur M. Laycock,
By Foster, Freeman, Watson & Coit,
Attorneys

UNITED STATES PATENT OFFICE.

ARTHUR M. LAYCOCK, OF KINGSTON, PENNSYLVANIA.

ROLLER-BEARING.

1,338,939.  Specification of Letters Patent. Patented May 4, 1920.

Application filed March 13, 1919. Serial No. 282,348.

*To all whom it may concern:*

Be it known that I, ARTHUR M. LAYCOCK, a subject of the King of Great Britain, having taken out my second naturalization papers, and residing at Kingston, county of Luzerne, State of Pennsylvania, have invented certain new and useful Improvements in Roller-Bearings, of which the following is a specification.

This invention relates to roller bearings and has particular reference to the means for and method of fastening together and arranging the parts making up the race rings inclosing the rollers. It includes the broad idea of securing the end flanges which hold the rollers in place to the race rings by spot welding. The novel features of the invention will be apparent from the following description taken in connection with the drawings.

In the drawings, Figure 1 is a vertical section through a roller bearing embodying my invention;

Fig. 2 is an end view of the same bearing partly broken away;

Fig. 3 is a vertical section through a modified form of bearing partly broken away;

And Fig. 4 is an end view of the form of bearing shown in Fig. 3 partly broken away.

As shown in Fig. 1 the bearing includes an inner cylindrical member 10 which has smooth or square ends and a similar outer member 11 which has smooth or square ends in line with the ends of the member 10. These two members constitute the raceway or bearing surfaces on which the rollers run, the rollers being mounted between them as shown in the drawing. A flat radial ring or flange 12 fits against the end of the member 11 and projects inwardly so as to form a flange extending partly across the ends of the rollers held between the members 10 and 11. A similar flange 13 is placed at the opposite end of the member 11. Flanges or rings 14 and 15 also fit against the ends of the member 10 and project outwardly partly across the end of the rollers. It will be observed that these end flanges or rings have smooth surfaces fitting against the ends of the members 10 and 11 and in the particular form shown in Fig. 1, each has a depression 16 countersunk in its outer margin opposite the part of the material constituting the members 10 and 11 which is farthest removed from the bearing surface. The rings are securely and permanently fastened to the members 10 and 11 by electric spot welding applied in the depressions 16. While it is not absolutely essential that this spot welding shall be as shown at the outer portion of the material it should be as far removed from the bearing surface as possible so as not to affect the temper or hardness of the bearing surface. It will, of course, be understood that the rollers 17 of a known type are placed within the bearing between the members 10 and 11 before at least one of the end flanges on each member is welded in place and I of course may use any usual spacer 18 in connection with the rollers.

In Figs. 3 and 4 I have shown a modified construction in which the flanges 12, 13, 14 and 15 are secured to the members 10 and 11 by acetylene welding or by electric arc welding for a certain part of the periphery indicated at 19. It will be understood that the parts are assembled in this instance including the rollers and spacer in the same way as in the form shown in Fig. 1. It will also be understood that the parts will be spot welded at intervals around the circumference, a sufficient number of welding points being used to properly hold the parts together. While spot welding has been specifically described and shown and has certain advantages it is to be understood that in its broader aspects the invention is not limited to spot welding as the welded surface may be made continuous.

It will be observed that the construction of the bearing is very simple involving the use of two plain cylindrical members which may be cut from stock and the end flanges which merely fit flat against the ends of the cylindrical members and are then permanently secured by the welding. This makes not merely a bearing which can be made cheaply but one which will be very strong and durable.

Having described my invention, what I claim as new and desire to secure by Letters Patent is:

1. In a device of the class described the combination with inner and outer cylindrical members constituting the coöperating bearing surfaces of a roller bearing, of rollers between said members, flanges fitting against the ends of said members and projecting partly across the ends of said rollers, the said flanges being spot welded to said cylindrical members at a plurality of points.

2. In a device of the class described the combination with inner and outer cylindrical members constituting the coöperating bearing surfaces of roller bearings having flat ends, of rollers between said members, flat rings fitting against the flat ends of said members and spot welded thereto at intervals forming flanges projecting partly across the ends of said rollers.

3. In a device of the class described the combination with inner and outer cylindrical members constituting the coöperating bearing surfaces of roller bearings having flat ends, of rollers between said members, flat rings fitting against the flat ends of said members and projecting partly across the ends of said rollers, the said flanges being spot welded to the ends of said members at intervals, the welded spots being in that part of the material removed from the bearing surface.

4. In a device of the class described the combination with inner and outer raceways for roller bearings, of end flanges spot welded to said raceways.

5. The method of forming a roller bearing raceway which consists in assembling a cylindrical bearing member having flat ends with flat ring like flanges so that said flanges will fit against said flat ends and spot welding said flanges to said flat ends at intervals and at the part of the material in the thickness of said members farthest from the bearing surface of said member.

6. In a device of the class described the combination with inner and outer cylindrical members constituting the coöperating bearing surfaces of a roller bearing, of rollers between said members, flanges fitting against the ends of said members and projecting partly across the ends of said rollers, the said flanges being welded to the ends of said cylindrical members.

7. In a device of the class described the combination with inner and outer cylindrical members constituting the coöperating bearing surfaces of roller bearings having flat ends, of rollers between said members, flat rings fitting against the flat ends of said members and welded thereto at intervals forming flanges projecting partly across the ends of said rollers.

8. The method of forming a roller bearing raceway which consists in assembling a cylindrical bearing member and a ring-like flange fitting the end of said bearing member and projecting within its bore and spot welding said flange to said end.

9. The method of forming a roller bearing raceway which consists in assembling a cylindrical bearing member and a ring-like flange fitting the end of said bearing member and projecting within its bore and spot welding said flange to said end at intervals and at the part of the material in the thickness of said member farthest from the bearing surface of said member.

10. In a device of the class described the combination with inner and outer raceways for roller bearings, of an end flange spot welded to one of said raceways.

11. In a device of the class described, the combination with inner and outer cylindrical members constituting the coöperating bearing surfaces of a roller bearing, of rollers between said members, flanges fitting against the ends of one of said members and projecting partly across the ends of said rollers, the said flanges being welded to the ends of said cylindrical members.

In testimony whereof I affix my signature.

ARTHUR M. LAYCOCK.